US012618177B2

(12) United States Patent
Wang et al.

(10) Patent No.: US 12,618,177 B2
(45) Date of Patent: May 5, 2026

(54) METHOD OF MANUFACTURING A WOVEN FABRIC FOR A COMPOSITE COMPONENT FOR A TURBINE ENGINE

(71) Applicant: General Electric Company, Schenectady, NY (US)

(72) Inventors: Mingchao Wang, West Chester, OH (US); Mitchell Boyer, Cincinnati, OH (US); Ming Xie, Dayton, OH (US); Douglas Lorrimer Armstrong, Needham, MA (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 176 days.

(21) Appl. No.: 18/673,853

(22) Filed: May 24, 2024

(65) Prior Publication Data

US 2025/0361657 A1 Nov. 27, 2025

(51) Int. Cl.
| | |
|---|---|
| *D03D 25/00* | (2006.01) |
| *B29B 11/16* | (2006.01) |
| *B29C 70/24* | (2006.01) |
| *B29C 70/72* | (2006.01) |
| *D03D 11/02* | (2006.01) |
| *B29L 31/08* | (2006.01) |

(52) U.S. Cl.
CPC ............ *D03D 25/005* (2013.01); *B29B 11/16* (2013.01); *B29C 70/24* (2013.01); *B29C 70/72* (2013.01); *D03D 11/02* (2013.01); *B29L 2031/082* (2013.01); *D10B 2505/02* (2013.01)

(58) Field of Classification Search
CPC ................................................... D03D 25/005
See application file for complete search history.

(56) References Cited

U.S. PATENT DOCUMENTS

| | | | | |
|---|---|---|---|---|
| 5,091,246 A | * | 2/1992 | Yasui | D03D 41/004 |
| | | | | 442/205 |
| 6,129,122 A | * | 10/2000 | Bilisik | D03D 25/005 |
| | | | | 139/11 |
| 6,418,973 B1 | * | 7/2002 | Cox | B32B 3/20 |
| | | | | 139/383 R |
| 8,038,408 B2 | | 10/2011 | McMillan | |

(Continued)

FOREIGN PATENT DOCUMENTS

| | | |
|---|---|---|
| CN | 108263490 A | 7/2018 |
| FR | 3141094 A1 | 4/2024 |

*Primary Examiner* — Atul P. Khare

(74) *Attorney, Agent, or Firm* — Venable LLP; David D. Leege; Michele V. Frank

(57) ABSTRACT

A method of manufacturing a woven fabric for a composite component for a turbine engine. The method includes weaving a plurality of reinforcing fiber tows to form a woven fabric with a surface. The reinforcing fiber tows include a plurality of first fiber tows and a plurality of second fiber tows oriented transversely to the plurality of first fiber tows. The woven fabric is a three-dimensional woven fabric. The method also includes forming, during weaving the plurality of reinforcing fiber tows, a cavity extending in the first direction. Forming the cavity includes positioning the plurality of first fiber tows to create the cavity and weaving the plurality of second fiber tows around the cavity. The method further includes forming, during weaving the plurality of reinforcing fiber tows, a slit connecting the cavity to the surface.

19 Claims, 8 Drawing Sheets

(56)          References Cited

U.S. PATENT DOCUMENTS

| | | | | |
|---|---|---|---|---|
| 8,499,450 B2 * | 8/2013 | Naik | .................... | D03D 13/004 |
| | | | | 29/889.71 |
| 9,664,053 B2 | 5/2017 | Marshall et al. | | |
| 10,041,196 B2 | 8/2018 | Gimat et al. | | |
| 10,232,926 B2 | 3/2019 | Goehlich | | |
| 10,408,084 B2 | 9/2019 | Thomas et al. | | |
| 10,519,576 B2 * | 12/2019 | Marchal | .................... | D03D 1/00 |
| 10,724,387 B2 | 7/2020 | Farrar et al. | | |
| 11,506,065 B1 | 11/2022 | Kim et al. | | |
| 11,549,380 B2 | 1/2023 | Farrar et al. | | |
| 11,732,589 B1 | 8/2023 | Campbell et al. | | |
| 11,739,649 B2 | 8/2023 | Marchal et al. | | |
| 11,767,098 B2 | 9/2023 | Courtier et al. | | |
| 12,352,173 B2 * | 7/2025 | Winder | .................... | F16J 15/30 |
| 2023/0271694 A1 | 8/2023 | Grenestedt | | |

\* cited by examiner

METHOD OF MANUFACTURING A WOVEN FABRIC FOR A COMPOSITE COMPONENT FOR A TURBINE ENGINE

GOVERNMENT INTEREST

This invention was made with United States Government support. The United States Government may have certain rights in the invention.

TECHNICAL FIELD

The present disclosure relates to three-dimensional woven fabrics and methods of forming the woven fabrics, particularly, woven fabrics used in composite components for aircraft engines.

BACKGROUND

Turbine engines used in aircraft generally include a fan and a turbo-engine section arranged in flow communication with one another. A combustor is arranged in the turbo-engine to generate combustion gases for driving a turbine in the turbo-engine of the turbine engine, and the turbine may be used to drive the fan. A portion of air flowing into the fan flows through the turbo-engine as core air, and another portion of the air flowing into the fan bypasses the core section and flows through the turbine engine as bypass air. The turbo-engine section may include one or more compressors to compress the core air before the core air flows into the combustor. Composite materials may be used to manufacture various components of the turbine engine, particularly, when the turbine engine is a turbine engine for an aircraft.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 6A is a first step and FIG. 6B is a second step subsequent to the steps shown in FIG. 6A.

DETAILED DESCRIPTION

Figure 1:
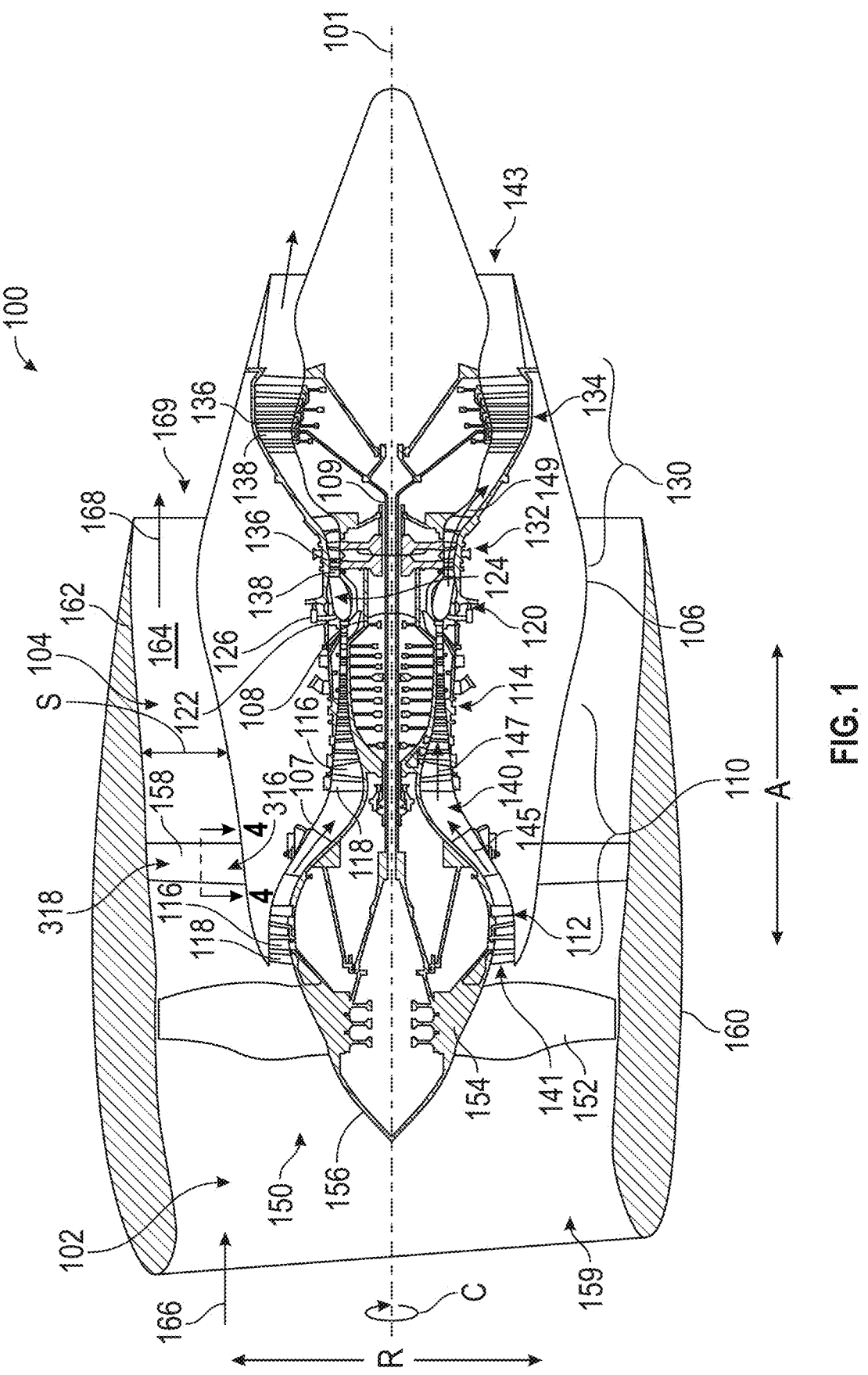
FIG. 1 is a schematic, cross-sectional view of a turbine engine of for an aircraft.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," "third," and the like, may be used interchangeably to distinguish one component from another and are not intended to signify location or importance of the individual components.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

The singular forms "a," "an," and "the" include plural references unless the context clearly dictates otherwise.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

The term "composite," as used herein, is indicative of a material having two or more constituent materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), and a metal matrix composite (MMC). The composite may be formed of a matrix material and a reinforcing element, such as a fiber (referred to herein as a reinforcing fiber).

As used herein "reinforcing fibers" may include, for example, glass fibers, carbon fibers, steel fibers, or para-aramid fibers, such as Kevlar® available from DuPont of Wilmington, Delaware. The reinforcing fibers may be in the form of fiber tows that include a plurality of fibers that are formed into a bundle.

"Preform" as used herein is a piece of three-dimensional woven fabric formed by a plurality of reinforcing fibers including warp fiber tows and weft fiber tows.

As used herein, a "composite component" refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. The adhesive can require curing at elevated temperatures or other hardening techniques.

As used herein, PMC refers to a class of materials. The PMC material may be a prepreg. A prepreg is a reinforcement material (e.g., a reinforcing fiber) pre-impregnated with a polymer matrix material. Non-limiting examples of processes for producing polymeric prepregs include hot melt pre-pregging in which a molten resin is deposited onto the fiber reinforcement material and powder pre-pregging in which a resin is deposited onto the fiber reinforcement material, by way of a non-limiting example, electrostatically, and then adhered to the fiber, by way of a non-limiting example, in an oven or with the assistance of heated rollers.

Resins for matrix materials of PMCs can be generally classified as thermosets or thermoplastics. Thermoplastic resins are generally categorized as polymers that can be repeatedly softened and caused to flow when heated, and hardened when sufficiently cooled due to physical rather than chemical changes. Notable example classes of thermoplastic resins include nylons, thermoplastic polyesters, polyaryletherketones, and polycarbonate resins. Specific examples of high-performance thermoplastic resins that have been contemplated for use in aerospace applications include polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg with thermoplastic polymers, another non-limiting example utilizes a woven fabric. Woven fabrics can include, but are not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and the reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers to a mold or a cavity. The dry fibers can include prepreg, braided material, woven material, or any combination thereof. Resin can be pumped into or otherwise provided to the mold or the cavity to impregnate the dry fibers. The combination of the impregnated fibers and the resin is then cured and removed from the mold. When removed from the mold, the composite component can require post-curing processing. RTM may be a vacuum assisted process. That is, air from the cavity or the mold can be removed and replaced by the resin prior to heating or curing. The placement of the dry fibers also can be manual or automated. The dry fibers can be contoured to shape the composite component or to direct the resin. Optionally, additional layers or reinforcing layers of a material differing from the dry fiber can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to by their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled (e.g., form fiber tows) and/or coated prior to inclusion within the matrix. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or a burn-out to yield a high char residue in the preform, and subsequent melt-infiltration with silicon, or a cure or a pyrolysis to yield a silicon carbide matrix in the preform, and subsequent chemical vapor infiltration with silicon carbide. Additional steps may be taken to improve densification of the preform, either before or after chemical vapor infiltration, by injecting the preform with a liquid resin or a polymer followed by a thermal processing step to fill the voids with silicon carbide. CMC material as used herein may be formed using any known or hereafter developed methods, including but not limited to melt infiltration, chemical vapor infiltration, polymer impregnation pyrolysis (PIP), or any combination thereof.

The term "metallic" as used herein is indicative of a material that includes metal such as, but not limited to, titanium, iron, aluminum, stainless steel, and nickel alloys. A metallic material or a metal alloy can be a combination of at least two or more elements or materials, where at least one is a metal.

As noted above, certain components of gas turbine engines, particularly, those used in aircraft, may be made from composite materials. Such components include, for example, various airfoils including static airfoils, such as vanes, like outlet guide vanes in the bypass airflow path, or nozzles, such as compressor nozzles. These airfoils are located in an air flow path of the gas turbine engine, and components of the gas turbine engine positioned radially inward of the flow path may require a connection to components and systems that are positioned radially outward of the flow path. These static airfoils may thus include a service tube provided in these airfoils to allow fluids, electrical and other connections, to pass through the static airfoil and thus the air flow path. A service tube may be provided by machining a cavity in the airfoil, inserting the tube in the cavity, and then supporting the tube with a spring to secure the tube in the cavity. When the airfoil is formed from a composite, the cavity may be machined, but machining can be difficult and requires extra processing. Alternatively, when the preform is formed and before infiltration and curing, tooling, such as a mandrel may be placed in the preform, but again, this requires extra processing. In addition, the cavity needs to have sufficient clearance to insert the tube and then, because of the increased clearance, the spring is used hold the tube in place. The clearance and the spring increase the thickness of the airfoil. The embodiments discussed herein disclose methods of forming a three-dimensional (3D) woven fabric in which the tube may be co-molded, resulting in a thinner strut and better producibility.

The composite materials discussed herein may be particularly suitable for use in turbine engines for aircraft. FIG. 1 is a schematic, cross-sectional view a turbine engine 100 that may be used on an aircraft. The turbine engine 100 has an axial direction A (extending parallel to a longitudinal centerline axis 101, shown for reference in FIG. 1), a radial direction R, and a circumferential direction C. The circumferential direction C extends in a direction rotating about the longitudinal centerline axis 101 (the axial direction A). In the embodiment depicted in FIG. 1, the turbine engine 100 is a high bypass turbofan engine, including a fan section 102 and a turbo-engine 104 disposed downstream from the fan section 102.

The turbo-engine 104 depicted in FIG. 1 includes in serial flow relationship, a compressor section 110, a combustion section 120, and a turbine section 130. The turbo-engine 104 is substantially enclosed within an outer casing 106 that is substantially tubular and defines a core inlet 141. In this embodiment, the core inlet 141 is annular. As schematically shown in FIG. 1, the compressor section 110 includes a booster or a low-pressure (LP) compressor 112 followed downstream by a high-pressure (HP) compressor 114. The combustion section 120 is downstream of the compressor section 110. The turbine section 130 is downstream of the combustion section 120 and includes a high-pressure (HP) turbine 132 followed downstream by a low-pressure (LP) turbine 134. The turbo-engine 104 further includes a core air exhaust nozzle 143 (also referred to as a jet exhaust nozzle) that is downstream of the turbine section 130. The compressor section 110, the combustion section 120, and the turbine section 130 together define, at least in part, a core air flow path 140 extending from the core inlet 141 to the core air exhaust nozzle 143, and through which core air 145 flows. As will be discussed in more detail below, the turbo-engine 104 includes a high-pressure (HP) shaft 108 or a HP spool, and a low-pressure (LP) shaft 109. The HP shaft 108 drivingly connects the HP turbine 132 to the HP compressor 114. The HP turbine 132 and the HP compressor 114 rotate in unison through the HP shaft 108. The LP shaft 109 drivingly connects the LP turbine 134 to the LP compressor 112. The LP turbine 134 and the LP compressor 112 rotate in unison through the LP shaft 109.

Each of the LP compressor 112 and the HP compressor 114 may include a plurality of compressor stages. In each stage, a plurality of compressor blades 116 rotate relative to a corresponding plurality of static compressor vanes 118 (also called nozzles) to compress or to pressurize the core air 145 passing through the stage. In a single compressor stage, the plurality of compressor blades 116 can be provided in a ring, extending radially outwardly relative to the longitudinal centerline axis 101 from a blade platform to a blade tip (e.g., extend in the radial direction R). The compressor blades 116 may be a part of a compressor rotor that includes a disk and the plurality of compressor blades 116 extend radially from the disk. Other configurations of the compressor rotor may be used, including, for example, blisks where the disk and the compressor blades 116 are integrally formed with each other to be a single piece. The corresponding static compressor vanes 118 are positioned upstream of and adjacent to the rotating compressor blades 116. The compressor vanes 118 for a stage of the compressor can be mounted to a core casing 107 in a circumferential arrangement. The core casing 107 may define, at least in part, the core air flow path 140. Each compressor stage may be used to sequentially compress the core air 145 flowing through the core air flow path 140, generating compressed air 147. Any suitable number of compressor blades 116, compressor vanes 118, and compressor stages may be used.

Each of the HP turbine 132 and the LP turbine 134 also may include a plurality of turbine stages. In each stage, a plurality of turbine blades 136 rotate relative to a corresponding plurality of static turbine vanes 138 (also called a nozzle) to extract energy from combustion gases 149 passing through the stage. The turbine blades 136 may be a part of a turbine rotor. Any suitable configuration for a turbine rotor may be used, including, for example, a disk with the plurality of turbine blades 136 extending from the disk. The corresponding static turbine vanes 138 are positioned upstream of and adjacent to the rotating turbine blades 136. The turbine vanes 138 for a stage of the turbine can be mounted to the core casing 107 in a circumferential arrangement.

In the combustion section 120, fuel, received from a fuel system (not shown), is injected into a combustion chamber 124 of a combustor 122 by fuel nozzles 126. The fuel is mixed with the compressed air 147 from the compressor section 110 to form a fuel and air mixture, and combusted, generating combustion products (i.e., combustion gases 149). As will be discussed further below, adjusting a fuel metering unit (not shown) of the fuel system changes the volume of fuel provided to the combustion chamber 124 and, thus, changes the amount of propulsive thrust produced by the turbine engine 100 to propel the aircraft. The combustion gases 149 are discharged from the combustion chamber 124. These combustion gases may be directed into the turbine blades 136 of the HP turbine 132 and, then, the turbine blades 136 of the LP turbine 134, and the combustion gases 149 drive (rotate) the turbine blades 136 of the HP turbine 132 and the LP turbine 134. Any suitable number of turbine blades 136, turbine vanes 138, and turbine stages may be used. After flowing through the turbine section 130, the combustion gases 149 are exhausted from the turbine engine 100 through the core air exhaust nozzle 143 to provide propulsive thrust.

The turbine engine 100 and, more specifically, the turbo-engine 104 further includes one or more drive shafts. As noted above, the turbo-engine 104 includes the high-pressure (HP) shaft 108 drivingly connecting the HP turbine 132 to the HP compressor 114, and the low-pressure (LP) shaft 109 drivingly connecting the LP turbine 134 to the LP compressor 112. More specifically, the turbine rotors of the HP turbine 132 are connected to the HP shaft 108, and the compressor rotors of the HP compressor 114 are connected to the HP shaft 108. The combustion gases 149 are routed into the HP turbine 132 and expanded through the HP turbine 132 where a portion of thermal energy or kinetic energy from the combustion gases 149 is extracted via the one or more stages of the turbine blades 136 and turbine vanes 138 of the HP turbine 132. This causes the HP shaft 108 to rotate, which supports operation of the HP compressor 114 (self-sustaining cycle) and rotating the compressor rotors and, thus, the compressor blades 116 of the HP compressor 114 via the HP shaft 108. In this way, the combustion gases 149 do work on the HP turbine 132. The combustion gases 149 are then routed into the LP turbine 134 and expanded through the LP turbine 134. Here, a second portion of the thermal energy or the kinetic energy is extracted from the combustion gases 149 via one or more stages of the turbine blades 136 and the turbine vanes 138 of the LP turbine 134. This causes the LP shaft 109 to rotate, which supports operation of the LP compressor 112 (self-sustaining cycle), and rotating the compressor rotors and, thus, the compressor blades 116 of the LP compressor 112 via the LP shaft 109. In this way, the combustion gases 149 do work on the LP turbine 134. The HP shaft 108 and the LP shaft 109 are disposed coaxially about the longitudinal centerline axis 101. The HP shaft 108 has a diameter greater than that of the LP shaft 109, and the HP shaft 108 is located radially outward of the LP shaft 109. The HP shaft 108 and the LP shaft 109 are rotatable about the longitudinal centerline axis 101 and, as discussed above, coupled to rotatable elements such as the compressor rotors and the turbine rotors.

The fan section 102 shown in FIG. 1 includes a fan 150 having a plurality of fan blades 152 coupled to a disk 154. The fan blades 152 and the disk 154 are rotatable, together, about the longitudinal centerline (axis) 101 by the LP shaft 109. The LP compressor 112 may also be directly driven by the LP shaft 109, as depicted in FIG. 1. The disk 154 is covered by a fan hub 156 aerodynamically contoured to promote an airflow through the plurality of fan blades 152. Further, a nacelle 160 circumferentially surrounds the fan 150, and in the depicted embodiment, at least a portion of the turbo-engine 104. The nacelle 160 may also be referred to as an annular fan casing or an outer nacelle. The nacelle 160 is supported relative to the turbo-engine 104 and, more specifically, the outer casing 106 by a plurality of outlet guide vanes 158 that are circumferentially spaced about the nacelle 160 and the turbo-engine 104. A downstream section 162 of the nacelle 160 extends over an outer portion of the turbo-engine 104 and, more specifically, the outer casing 106 so as to define a bypass airflow passage 164 therebetween.

During operation of the turbine engine 100, a volume of air 166 enters the turbine engine 100 through an inlet of the nacelle 160 and/or the fan section 102 (referred to herein as an engine inlet 159). As the volume of air 166 passes across the fan blades 152, a first portion of air (bypass air 168) is directed or routed into the bypass airflow passage 164, and a second portion of air (core air 145) is directed or is routed into an upstream section of the core air flow path 140, or, more specifically, into the core inlet 141. The ratio between the bypass air 168 and the core air 145 is commonly known as a bypass ratio. Simultaneously with the flow of the core air 145 through the core air flow path 140 (as discussed above), the bypass air 168 is routed through the bypass airflow passage 164 before being exhausted from a bypass air discharge nozzle 169 of the turbine engine 100, also providing propulsive thrust. The bypass air discharge nozzle 169 and the core air exhaust nozzle 143 are air exhaust nozzles of the turbine engine 100.

The turbine engine 100 shown in FIG. 1 and discussed herein (turbofan engine) is provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, an unducted single fan engine, and the like. In such a manner, in other embodiments, the gas turbine engine may have other suitable configurations, such as other suitable numbers or arrangements of shafts, compressors, turbines, fans, etc. Further, although the turbine engine 100 is shown as a direct drive, fixed-pitch turbofan engine, in other embodiments, the turbine engine 100 may be a geared turbine engine (e.g., including a gearbox between the fan 150 and a shaft driving the fan, such as the LP shaft 109), may be a variable pitch turbine engine (i.e., including a fan 150 having a plurality of fan blades 152 rotatable about their respective pitch axes), etc. Further, still, in alternative embodiments, aspects of the present disclosure may be incorporated into, or otherwise utilized with, any other type of engine, such as reciprocating engines.

The turbine engine 100 discussed herein is suitable for use on aircraft. Suitable aircraft include, for example, airplanes, helicopters, and unmanned aerial vehicles (UAV). In other embodiments, the turbine engine may be any other turbine engines, such as an industrial turbine engine incorporated into a power generation system, a nautical turbine engine on a ship or other vessel.

Various components of the turbine engine 100 may be formed from composite materials. These components are referred to herein as composite components. The fan blades 152, the outlet guide vanes 158, compressor blades 116, and compressor vanes 118 may be made from PMC materials, for example. Other composites, such as CMC materials, may be used for other components, including, for example, turbine blades 136, turbine vanes 138, and components of the combustion section 120 such as combustor liners used to form the combustion chamber 124. Moreover, although the embodiments are described relative to a turbine engine 100, the composite component and methods of manufacturing may be used to form composite components used in applications beyond turbine engines.

Figure 2A:
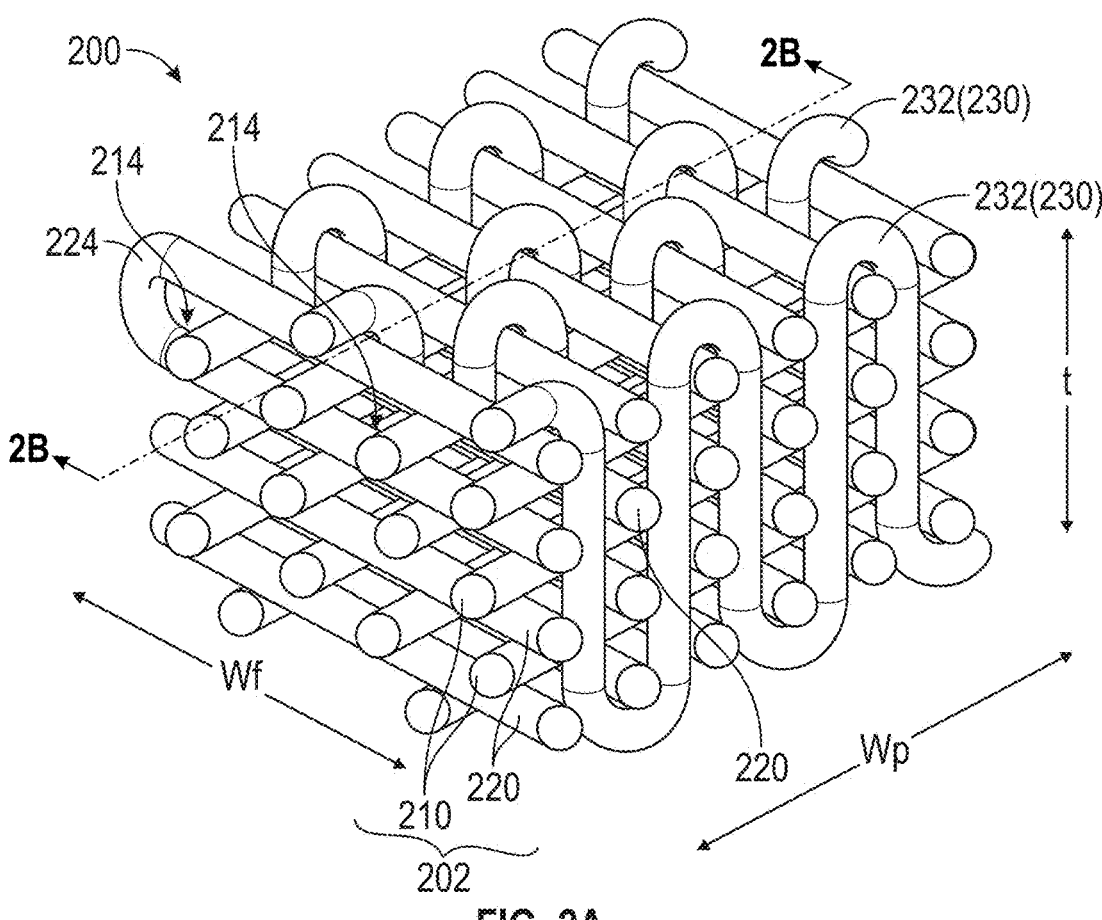
FIG. 2A is a schematic view of a three-dimensional fiber weave pattern.
Figure 2B:
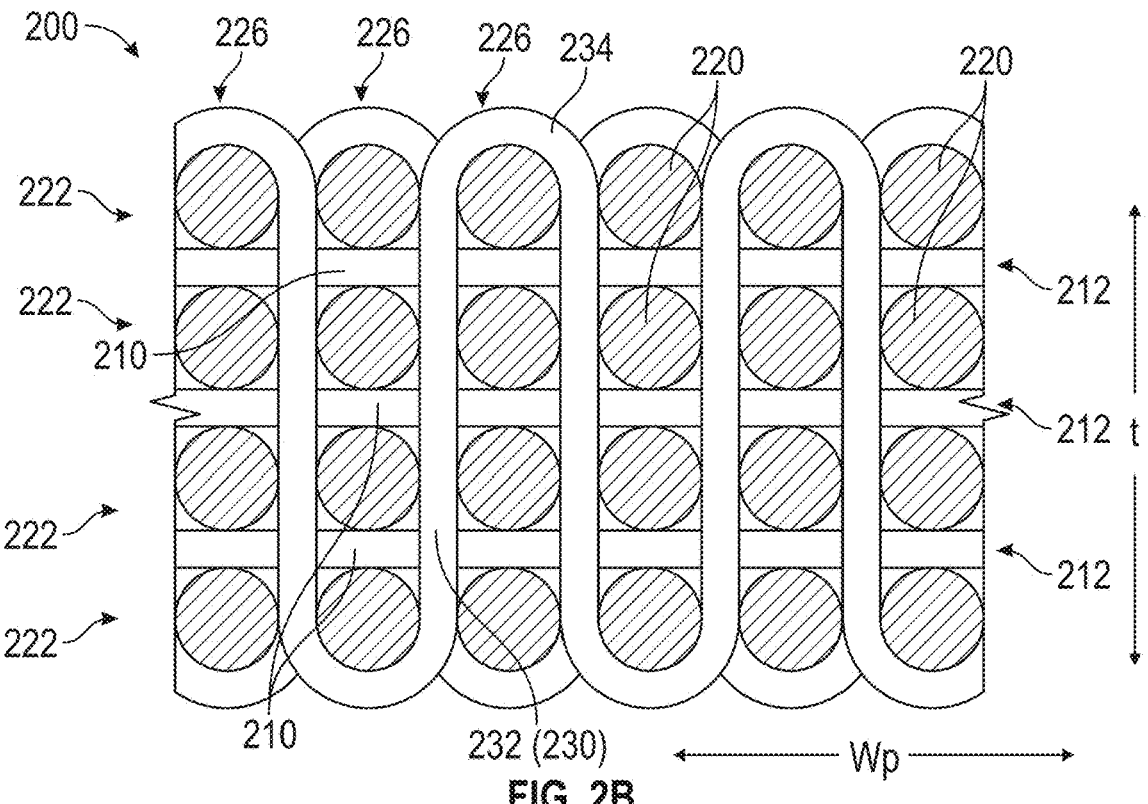
FIG. 2B is a schematic, cross-sectional view of the fiber weave pattern shown in FIG. 2A taken along line 2B-2B in FIG. 2A.

FIGS. 2A and 2B are schematics showing a three-dimensional fiber weave pattern that may be used to form a woven fabric 200. FIG. 2B is a cross-sectional view taken along line B-B in FIG. 2A. In embodiments discussed herein, the composite components may be formed from a plurality of reinforcing fibers and, more specifically a plurality of reinforcing fiber tows 202. The plurality of reinforcing fiber tows 202 are woven together to form the woven fabric 200. The plurality of reinforcing fiber tows 202 includes a plurality of first fiber tows, which in this embodiment is a plurality of warp fiber tows 210. The plurality of reinforcing fiber tows 202 also includes a plurality of second fiber tows, which in this embodiment is a plurality of weft fiber tows 220. The weft fiber tows 220 are oriented transversely to the warp fiber tows 210, and in the depicted embodiment, the warp fiber tows 210 and the weft fiber tows 220 are oriented generally orthogonally to each other. The woven fabric 200 thus includes a warp direction Wp (also referred to as a first direction) and a weft direction Wf (also referred to as a second direction). The warp fiber tows 210 extend in the warp direction Wp and the weft fiber tows 220 extend in the weft direction Wf.

In the depicted embodiment, the woven fabric 200 is a three-dimensional woven fabric and the woven fabric 200 also includes a thickness direction t. The thickness direction may also be referred to as a z direction. The warp fiber tows 210 may be arranged relative to each other to form a plurality of warp fiber layers 212 in the thickness direction t and to form a plurality of warp fiber columns 214 in the weft direction Wf. Three warp fiber layers 212 are depicted in FIGS. 2A and 2B, but the woven fabric 200 may include any other numbers of warp fiber layers 212, including more than three warp fiber layers 212.

During a weaving process, the warp fiber tows 210 may be held in tension in the warp direction Wp, and one of the weft fiber tows 220 is passed or drawn therethrough. A shuttle (not shown) may be used to draw the one of the weft fiber tows 220 through the warp fiber tows 210. The shuttle may be passed through the warp fiber tows 210 in a first direction and then reversed to pass through the warp fiber tows 210 at a different height in the thickness direction forming a plurality of weft fiber layers 222 in the thickness direction t. One of the weft fiber tows 220 may be continuous through at least a portion of the thickness of the woven fabric 200, and the one of the weft fiber tows 220 may include a portion extending in the thickness direction t, which may be referred to in some embodiments as a turnaround. This portion of the weft fiber tow thus may be referred to herein as a turnaround portion 224. The warp fiber tows 210 may be moved relative to each other to allow a space for the one of the weft fiber tows 220 to pass through the space. The warp fiber tows 210 may be moved relative to each other in different ways to create different patterns. In this way, weaving the woven fabric 200 includes positioning the warp fiber tows 210 (e.g., such that the warp fiber tows 210 are held stationary in tension), then laying the weft fiber tows 220 (e.g., such that the weft fiber tows 220 are drawn through and inserted over and under the corresponding warp fibers 210), and repeating this process until the woven fabric 200 is formed. The weft fiber tows 220 may be arranged relative to each other to form the plurality of weft fiber layers 222 in the thickness direction t and to form a plurality of weft fiber columns 226 in the warp direction Wp.

The woven fabric 200 also includes a plurality of interlocking fiber tows 230 (also referred to as Z-weaver fiber tows). The interlocking fiber tows 230 are additional warp fiber tows that are directed through the thickness of the woven fabric 200 during weaving to stitch the reinforcing fiber tows 202 together. The interlocking fiber tows 230 are woven to extend between two or more of the weft fiber layers 222. Different fiber patterns may be used for the interlocking fiber tows 230. A first interlocking fiber pattern, shown in FIGS. 2A and 2B, is an orthogonal interlocking pattern and the interlocking fiber tows 230 are referred to herein as orthogonal interlocking fiber tows 232. In this pattern, the orthogonal interlocking fiber tows 232 extend substantially in a direction that is orthogonal to the warp direction Wp, which is the thickness direction t in the depicted embodiment. As with the weft fiber tows 220, the interlocking fiber tows 230 (e.g., the orthogonal interlocking fiber tows 232) may include a turnaround portion 234. In the depicted embodiment, the turnaround portion 234 of the orthogonal interlocking fiber tows 232 is positioned to form an alternating pattern between each warp fiber columns 214. In the depicted embodiment, the orthogonal interlocking fiber tows 232 extend through the thickness of the woven fabric 200 and may be referred to as through-thickness interlocking fiber tows, but other thicknesses may be used.

Figures 2C, 2D:
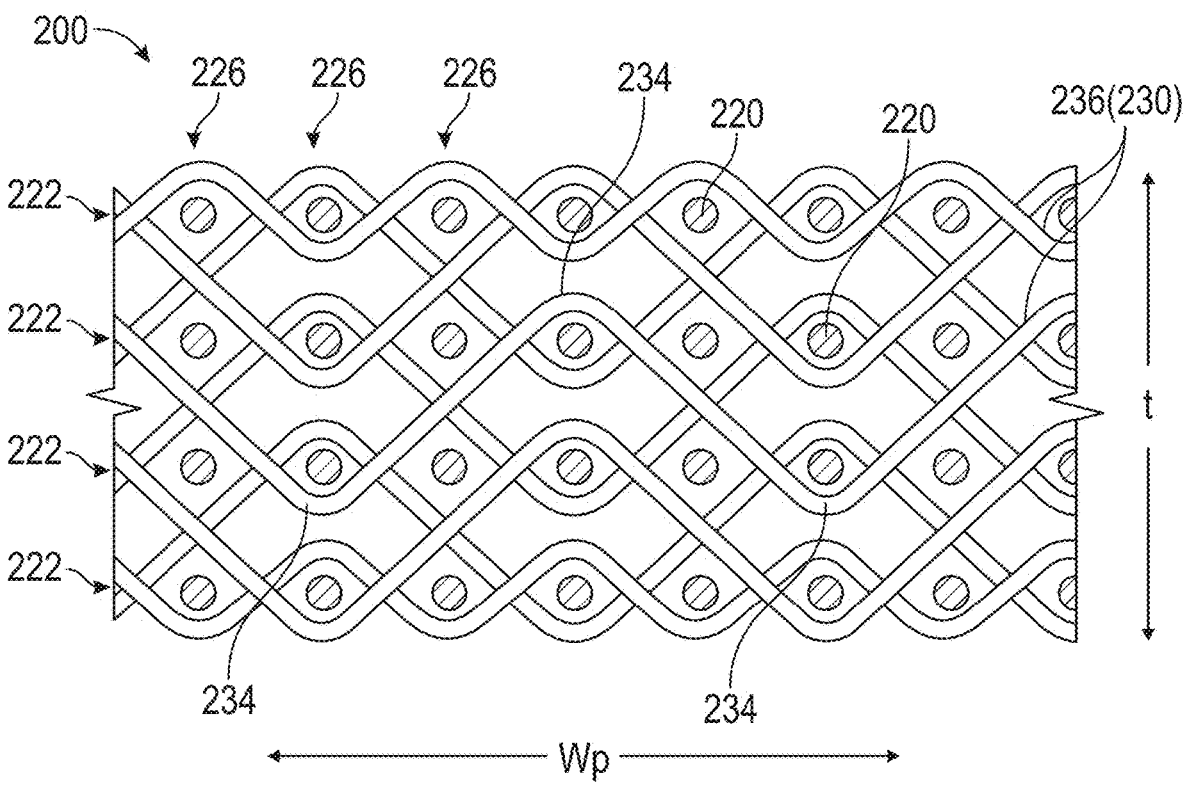
FIG. 2C is a schematic, cross-sectional view of a fiber weave pattern shown similar to fiber weave pattern shown in FIG. 2A, but with a different interlocking fiber pattern.
FIG. 2D is a schematic, cross-sectional view of a fiber weave pattern shown similar to fiber weave pattern shown in FIG. 2A, but with another interlocking fiber pattern.

A second interlocking fiber pattern, shown in FIG. 2C, is an angle interlock pattern and, more specifically, a layer-to-layer angle interlock pattern. FIG. 2C is a cross-sectional view of a woven fabric taken from a perspective similar to FIG. 2B. The interlocking fiber tows 230 are referred to in this embodiment as angled interlocking fiber tows 236. Instead of extending orthogonally through the woven fabric 200, the angled interlocking fiber tows 236 form an oblique angle relative to the warp direction Wp. In the depicted embodiment, the angled interlocking fiber tows 236 extend through adjacent weft fiber layers 222 in an alternating or a sinusoidal pattern to interlock these adjacent layers with each other, with the oblique angle formed between adjacent turnaround portions 234 of the angled interlocking fiber tows 236. The turnaround portions 234 of the angled interlocking fiber tows 236 are located on every other weft fiber columns 226, but, in other embodiments, two or more weft fiber columns 226 may be between adjacent turnaround portions 234 of the angled interlocking fiber tows 236. In other embodiments, the angled interlocking fiber tows 236 may extend through more than two adjacent weft fiber layers 222. For example, as shown in FIG. 2D, the interlocking fiber tows 230 are through-thickness interlocking fiber tows, which are referred to herein as through-thickness angled interlocking fiber tows 238. FIG. 2D is a cross-sectional view of a woven fabric taken from a perspective similar to FIG. 2B. The warp fiber tows 210 are omitted in FIGS. 2C and 2D for clarity.

Figure 3:
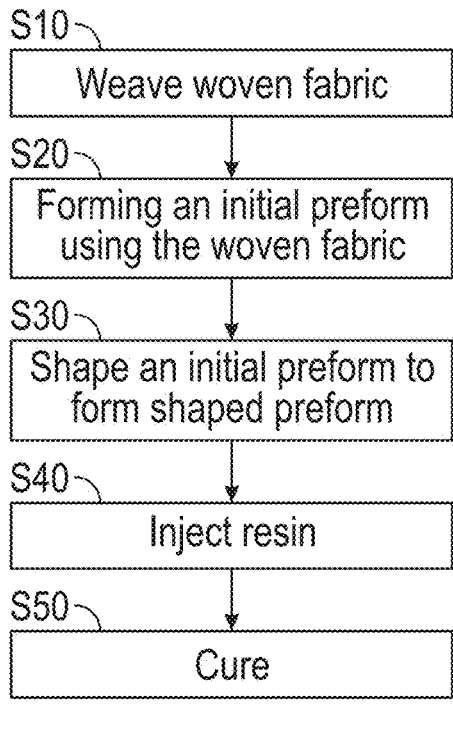
FIG. 3 is a flow chart of a general process for manufacturing a composite component that may be used in the turbine engine of FIG. 1.

FIG. 3 is a flow chart of a general process of manufacturing a composite component that may be used in the turbine engine of FIG. 1. The method includes, in step S10 weaving the woven fabric 200, such as on a loom. In step S20, the method includes forming an initial preform using one or more pieces of woven fabric 200. This step may include, for example, laying up a plurality of woven fabrics 200 or otherwise positioning the plurality of woven fabrics 200 relative to each other to form the initial preform. In step S30, the initial preform is shaped to form a shaped preform. Shaping the initial preform may include, for example, using a mold tool to shape the initial preform. Suitable shaping processes may include vacuum forming or other forming processes to impart a shape to the initial preform. The shaped preform may form a final preform, but optionally, additional machining processes and manufacturing processes, such as adding inserts, may be carried out on the shaped preform to form the final preform.

After the preform is complete (i.e., the final preform), a matrix material may be injected into the preform in step S40 to generate an infiltrated (or an impregnated) preform. When the composite component is a polymer matrix composite, polymers and/or a resin may be pumped into, injected into, or otherwise provided to a mold or a cavity to infiltrate or to impregnate the dry fibers in this step. This step may be done in conjunction with step S30 when using resin transfer molding (RTM) processes, for example. Other infiltration processes may be used in this step depending upon the matrix material. As noted above, the preform may be formed using prepreg fiber tows to introduce a matrix material, and, in such an embodiment, this step (step S40) may be omitted.

The method continues with curing the infiltrated preform in step S50 to bond the composite material and, more specifically, the matrix together forming the composite component. The curing process depends upon the material and may include solidifying or otherwise hardening the matrix material around the fiber tows within the preform. For example, when the matrix material is a polymer, the curing may include both solidifying and chemically crosslinking the polymer chains. Curing the infiltrated preform can include several processes. For instance, an infiltrated preform may be debulked and cured by exposing the infiltrated preform to elevated temperatures and pressures in an autoclave. The infiltrated preform may also be subjected to one or more further processes, such as, e.g., a burn off cycle and a densification process. The curing step S50 may be done in conjunction with step S40, such as when the matrix material is injected into the final preform in a molten state and the curing step includes cooling the matrix material.

Further, the composite component may be finish machined as needed. Finish machining may define the final finished shape or contour of the composite component. For example, when the composite component is a fan blade 152 (FIG. 1), the edges of the fan blade 152 may be machined to define the final shape or the contour of the airfoil. Additionally, the composite component can be coated with one or more suitable coatings, such as, e.g., an environmental barrier coating (EBC) or a polyurethane surface coating.

Figure 4:
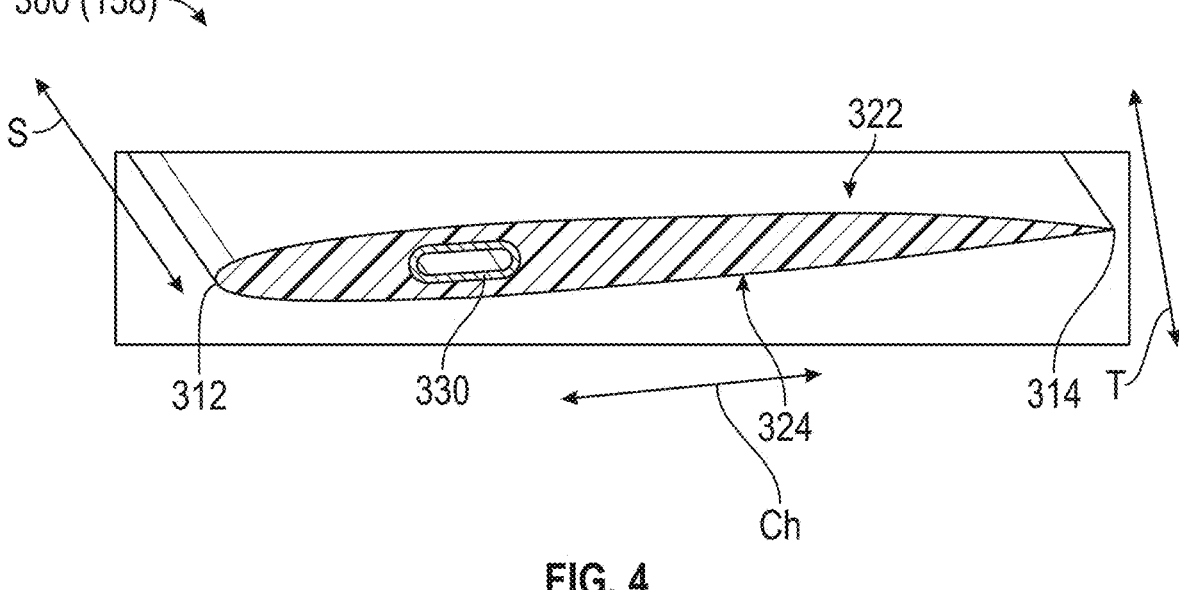
FIG. 4 is a schematic cross-sectional view, taken along line 4-4 in FIG. 1, of an airfoil that may be used in the turbine engine shown in FIG. 1.

FIG. 4 is a schematic cross-sectional view of a composite component that may be used in the turbine engine 100 of FIG. 1. As noted above, various components of the turbine engine 100 may be composite components formed from composite materials, and, in particular, a preform formed of one or more woven fabrics 200 (FIG. 2A). As depicted in FIG. 4, the composite component is an airfoil 300. More specifically, the airfoil 300 shown in FIG. 4 is an outlet guide vane 158, and FIG. 4 is a three-dimensional cross-sectional view of the outlet guide vane 158 taken along line 4-4 in FIG. 1. The description of the airfoil 300, however, applies to the other airfoils of the turbine engine 100, including, for example, the compressor vanes 118 (FIG. 1). The airfoil 300 and methods of forming the same are suitable for these components, which may be PMC components. However, the airfoil 300 and methods discussed herein are also applicable to CMC components, including, for example, the turbine vanes 138 (FIG. 1), as these processes do not require machining of the cavity to insert a service tube. These static airfoils 300 may also be referred to as struts and the methods discussed herein may be used for other composite struts located outside of air flow paths.

The airfoil 300 includes a leading edge 312, a trailing edge 314, an inner end portion 316 (FIG. 1), and an outer end portion 318 (FIG. 1). The inner end portion 316 and the outer end portion 318 may each be connected to a case defining the air flow passage in which the airfoil 300 is located. As shown in FIG. 1, in this example, when the airfoil 300 is the outlet guide vane 158, the airfoil 300 is connected on the inner end portion 316 to the outer casing 106 and the outer end portion 318 is connected to the nacelle 160. The airfoil 300 extends outwardly in a radial direction from the inner end portion 316 to the outer end portion 318. This direction may also be referred to as the spanwise direction S. Referring back to FIG. 4, the airfoil 300 includes surfaces formed on each side of the airfoil between the leading edge 312 and the trailing edge 314. These surfaces are a first surface 322 and a second surface 324 positioned on opposite sides of the airfoil 300. As can be seen in FIG. 4, the airfoil 300 is a symmetric airfoil. The airfoil 300 may have any suitable shape, however, including, for example, concave surfaces, and the airfoil 300 may be a cambered airfoil with the first surface 322 being a suction surface having a convex curvature and the second surface 324 being a pressure surface that is generally flat. The airfoil 300 also includes a chordwise direction Ch, perpendicular to the spanwise direction S and extending from the leading edge 312 to the trailing edge 314. A thickness direction T of the airfoil 300 is also perpendicular to each of the spanwise direction S and the chordwise direction Ch.

The airfoil 300 is a composite component comprised of a matrix material formed around the reinforcing fiber tows 202 (FIG. 2A). The composite material may be, for example, a polymer matrix composite (PMC). As noted above, however, the methods discussed herein may be used with other materials and thus the airfoil 300 may be formed from these other materials, and the airfoil 300 may be a ceramic matrix composite (CMC). The reinforcing fiber tows 202 are omitted in FIG. 4 for clarity.

The airfoil 300 also includes a tube 330 extending in the spanwise direction S through the airfoil 300. When the airfoil 300 is a PMC, the tube 330 may be formed from a metal, but when the airfoil 300 is formed from other materials and used in different environments, the tube 330 may be formed from other materials suitable for use in those environments. As will be discussed in more detail below, woven fabric 400 (FIG. 5) is woven (step S10 in FIG. 3) and, then, in step S20 (FIG. 3), the tube 330 is inserted into the woven fabric 400 before the woven fabric 400 (preform) is molded and cured (steps S30 to S50 in FIG. 3). The tube 330 is thus co-molded with the woven fabric 400. After curing, the matrix material is in contact with the tube 330, and, more specifically, the matrix material surrounds the tube 330 as depicted in FIG. 4. The tube 330 is an example of an insert that can be inserted and co-molded with the woven fabric 400. Other inserts may be used, including foam inserts used to form, for example, a composite strut with a foam core.

Figure 5:
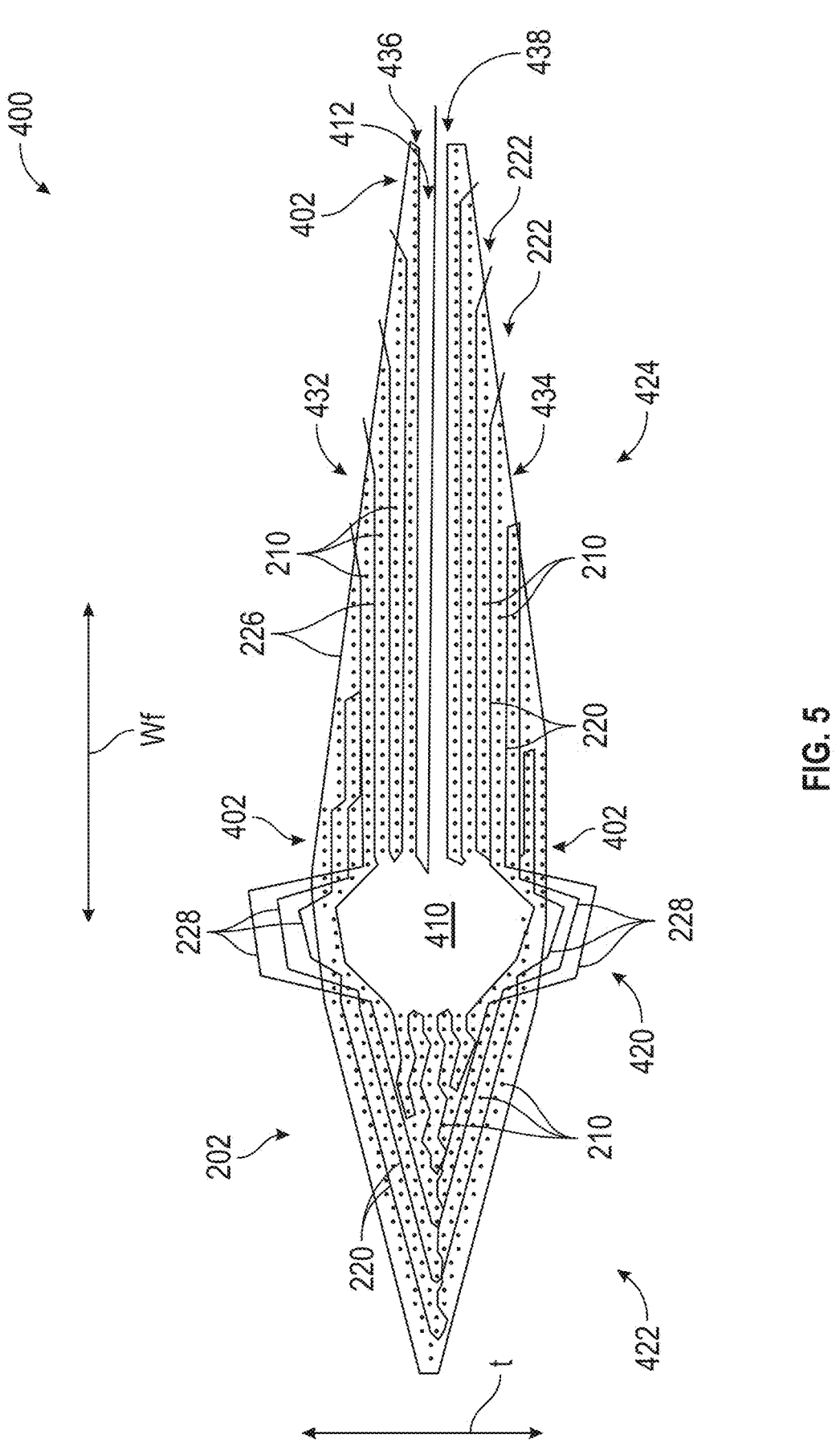
FIG. 5 is a schematic view of a woven fabric that may be used to form the airfoil shown in FIG. 4.

FIG. 5 is a schematic view of the woven fabric 400 that may be used to form the airfoil 300 shown in FIG. 4. The woven fabric 400 shown in FIG. 5 may be formed similarly to the woven fabric 200 discussed above with reference to FIGS. 2A to 2D, and that discussion applies here. The interlocking fiber tows 230 (FIGS. 2A to 2D) are omitted from FIGS. 5 to 6B for clarity. The woven fabric 400 also includes one or more surfaces 402 that are formed by the outer reinforcing fiber tows 202 of the woven fabric 400.

When forming the initial preform (step S20, FIG. 3, discussed above), the warp direction Wp (FIG. 2A) of the of the woven fabric 400 may be oriented in the spanwise direction S (FIG. 4) of the airfoil 300 (FIG. 4). Step S20 may thus include weaving and arranging the woven fabric 400 and reinforcing fiber tows 202 in the following manner during the process of weaving the woven fabric 400. The warp fiber tows 210 may extend and may be oriented in the spanwise direction S. Accordingly, the weft direction Wf of the woven fabric 400 may be generally oriented in the chordwise direction Ch (FIG. 4) of the airfoil 300. The weft fiber tows 220 generally extend and generally may be oriented in the chordwise direction Ch. The thickness direction t of the woven fabric 400 may also generally correspond to the thickness direction T of the airfoil 300.

The warp fiber tows 210 are positioned to form a cavity 410 extending in the warp direction (FIG. 2A). When the interlocking fiber tows 230 (FIG. 2B) are oriented in the warp direction Wp (FIG. 2B), the interlocking fiber tows 230 may be positioned similar to the warp fiber tows 210 to form the cavity 410. As the weft fiber tows 220 are woven into the warp fiber tows 210, the weft fiber tows 220 are woven around the cavity 410 and the weft fiber tows 220 do not extend through the cavity 410. As depicted in FIG. 5, the woven fabric 400 includes a region in the weft direction Wf that includes the cavity 410. This region is referred to herein as a cavity region 420. The woven fabric 400 also includes a leading region 422 and a trailing region 424. These regions are taken relative to the cavity 410 and the cavity region 420. Both the leading region 422 and the trailing region 424 include more weft fiber layers 222 than the portions of the woven fabric 400 in the cavity region 420. One or more of the weft fiber tows 220 may be woven to have a portion of the weft fiber tow 220 that extends beyond the surface 402 of the woven fabric 400 (referred to as an extension portion 228) in the cavity region 420. The extension portion 228 of the one or more weft fiber tows 220 that extend beyond the surface 402 may be trimmed as part of forming the woven fabric 400 or as part of a subsequent operation before molding.

The cavity 410 provides a space for the tube 330 (FIG. 4). The cavity 410, however, is surrounded by reinforcing fiber tows 202 and is an internal cavity of the woven fabric 400. To allow the tube 330 to be positioned in the cavity 410, the woven fabric 400 also includes a slit 412. The slit 412 connects the cavity 410 to the surface 402 of the woven fabric 400, and extends from the cavity 410 to the surface 402 and, as depicted in FIG. 5, the slit 412 extends to what will become the trailing edge 314 (FIG. 4) of the airfoil 300 (FIG. 4). The slit 412 is formed while weaving the plurality of the reinforcing fiber tows 202. As depicted in FIG. 5, the slit 412 is formed between two adjacent warp fiber layers 212 (FIG. 2B), creating a first portion and a second portion. In the depicted embodiment, the first portion and the second portion are positioned in in the trailing region 424 and will be referred to in the following discussion as a first trailing portion 432 and a second trailing portion 434. The slit 412 may be formed at other locations in the woven fabric 400, such as in the leading region 422, for example. The second trailing portion 434 opposes the first trailing portion 432 with the slit 412 therebetween. These two adjacent warp fiber layers 212 are referred to herein as bifurcated layers and, more specifically, a first bifurcated layer 436 in the first trailing portion 432 and a second bifurcated layer 438 in the second trailing portion 434. The slit 412 is depicted in FIG. 5 as being formed between two warp fiber layers 212.

The first trailing portion 432 and the second trailing portion 434 are free from interconnection across the slit 412 by the plurality of interlocking fiber tows 230. More specifically, the first bifurcated layer 436 and the second bifurcated layer 438 are not connected to each other across the slit 412 by the interlocking fiber tows 230. Likewise, when the weft fiber tows 220 are woven into the woven fabric 400, the first trailing portion 432 and the second trailing portion 434 are free from interconnection across the slit 412 by weft fiber tows 220. More specifically, the first bifurcated layer 436 and the second bifurcated layer 438 are not connected to each other across the slit 412 by the weft fiber tows 220. During the weaving process, a minimal amount of temporary interlocking tows may be used to stabilize the first bifurcated layer 436 and the second bifurcated layer 438 during processing, and the slit 412 may be formed by severing or otherwise removing these temporary interlocking tows prior to forming.

Various different fiber patterns may be used for the weft fiber tows 220. As depicted in FIG. 5, the weft fiber tows 220 begin in one of the first trailing portion 432 or the second trailing portion 434 and end in the other one of the first trailing portion 432 and the second trailing portion 434. For example, one weft fiber tow 220 may begin in the first trailing portion 432, and extend around the cavity 410 and through the leading region 422, before extending back around the cavity 410 again and into the second trailing portion 434.

Figures 6A, 6B:
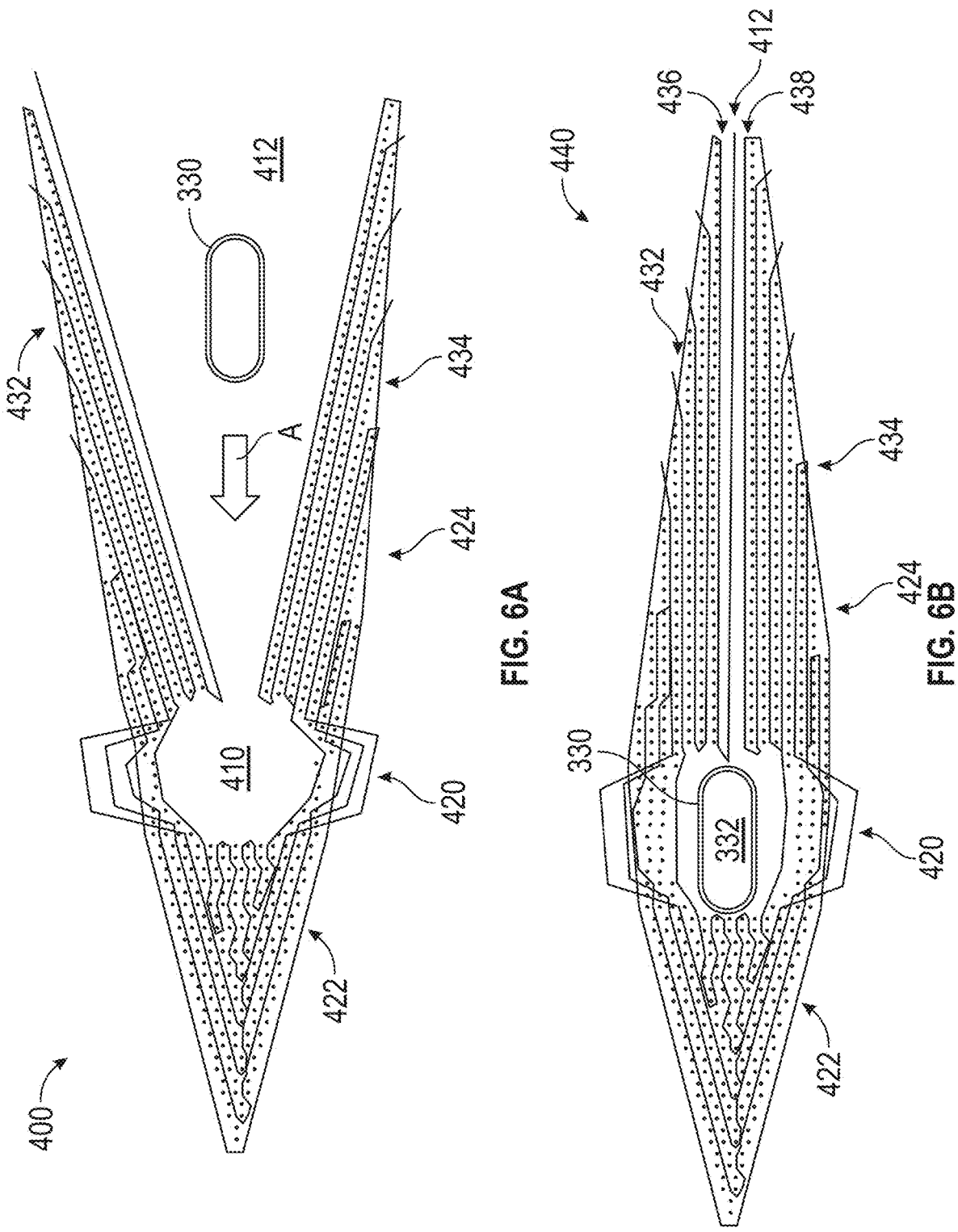
FIGS. 6A and 6B are schematics views illustrating steps of manufacturing a preform using the woven fabric shown in FIG. 5.

FIGS. 6A and 6B show steps of manufacturing a preform 440 (FIG. 6B) using the woven fabric 400 shown in FIG. 5. As part of forming the initial preform in step S20 (FIG. 3) discussed above, the tube 330 is inserted through the slit 412 as illustrated by the arrow A and then positioned in the cavity 410. To insert the tube 330 through the slit 412 and between the first trailing portion 432 and the second trailing portion 434, the first trailing portion 432 and the second trailing portion 434 may be pulled apart, separating the first bifurcated layer 436 and the second bifurcated layer 438 from each other to enlarge the slit 412. The slit 412 thus is opened to a size that allows the tube 330 to be slid into the cavity 410, as shown in FIG. 6A.

The tube 330 includes an opening 332 or passage through which fluid or electrical connections, for example, may pass. As shown in FIG. 6B, the tube 330 is positioned to have the opening 332 extend in the spanwise direction S (FIG. 4), and, as depicted in FIG. 6B, the tube 330 and, more specifically, the opening 332 extends in the warp direction Wp (FIG. 2A). After the tube 330 is positioned in the cavity 410, the first trailing portion 432 and the second trailing portion 434 moved back together to place the first bifurcated layer 436 and the second bifurcated layer 438 proximate to each other. The slit 412 thus is closed with the tube 330 inserted, forming the preform 440. The first bifurcated layer 436 and the second bifurcated layer 438 are positioned close enough to each other that, during the subsequent molding steps (e.g., steps S30-S50 in FIG. 3), the matrix material flows between the first bifurcated layer 436 and the second bifurcated layer 438 to bond the reinforcing fiber tows 202 and, more specifically, the warp fiber tows 210 and the weft fiber tows 220 in the first bifurcated layer 436 and the second bifurcated layer 438 together. In this way, curing the woven fabric 400 (step S50 in FIG. 3), bonds the first bifurcated layer 436 and the second bifurcated layer 438 together, removing the slit 412. The woven fabric 400 may be a near net shape woven fabric 400 allowing the preform to be prepared with minimal post processing after weaving. As depicted in FIG. 6B, the woven fabric 400 has the shape of the airfoil 300 (e.g., a symmetrical teardrop shape), and the slit 412 is formed on a chord axis of the airfoil 300.

Figure 7:
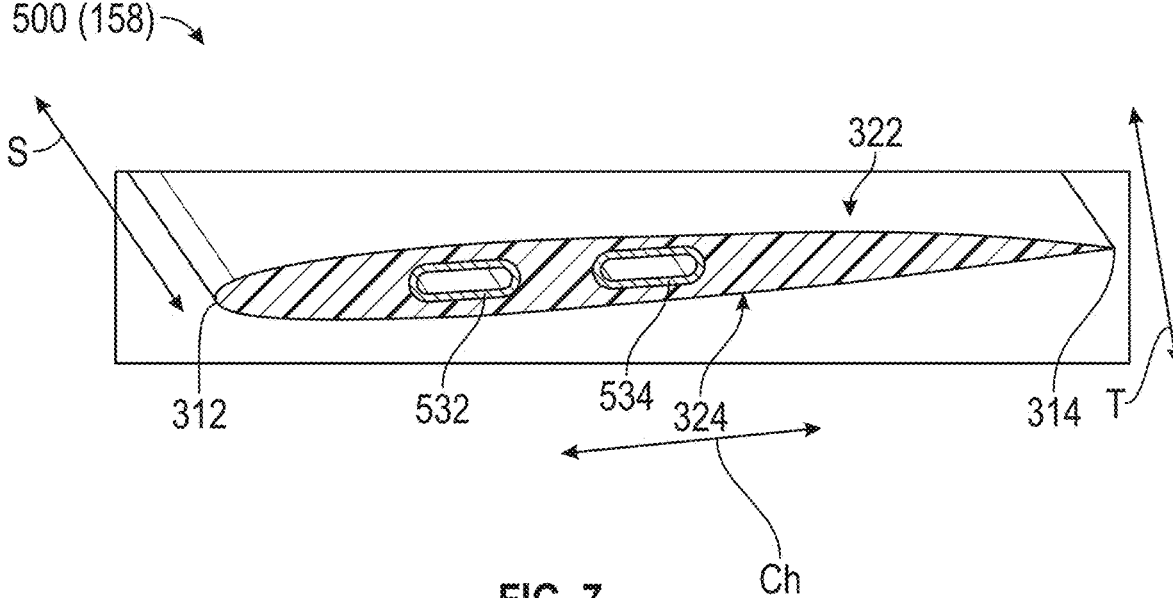
FIG. 7 is a schematic cross-sectional view, from a perspective similar to FIG. 4, of an airfoil that may be used in the turbine engine shown in FIG. 1.
Figure 8:
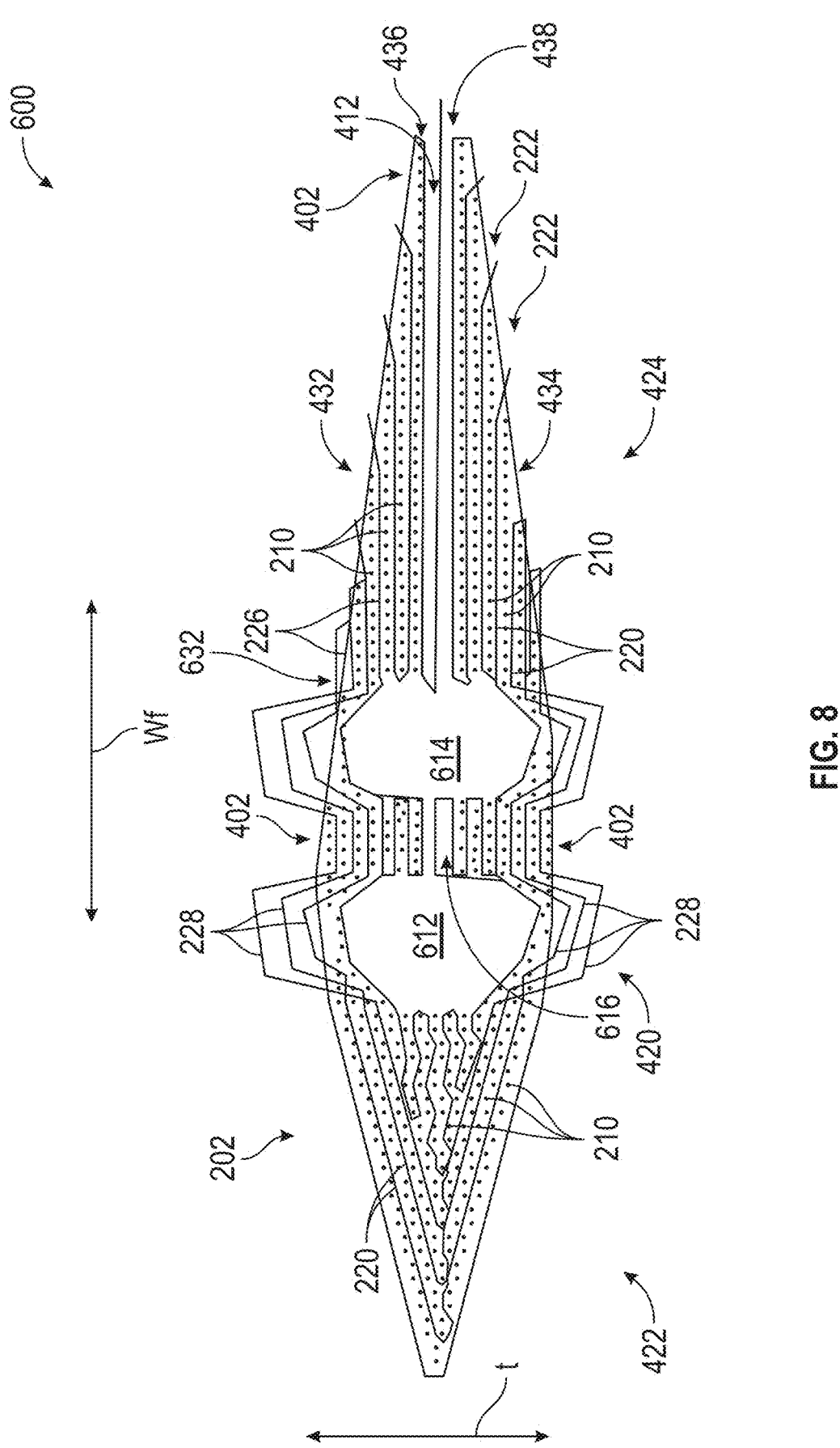
FIG. 8 is a schematic view of another woven fabric that may be used to form the airfoil shown in FIG. 7.

FIG. 7 is a schematic cross-sectional view of a composite component that may be used in the turbine engine 100 of FIG. 1. As depicted in FIG. 7, the composite component is an airfoil 500. More specifically, the airfoil 500 shown in FIG. 7 is an outlet guide vane 158, and FIG. 7 is a three-dimensional cross-sectional view of the outlet guide vane 158 from a perspective similar to FIG. 4. The description of the airfoil 500, however, applies to the other airfoils of the turbine engine 100, including, for example, the compressor vanes 118 (FIG. 1). The airfoil 500 depicted in FIG. 7 is similar to the airfoil 300 depicted in FIG. 4, but includes a plurality of inserts, such as a plurality of tubes. More specifically, the airfoil 500 includes a first tube 532 and a second tube 534. In FIG. 7, the first tube 532 and the second tube 534 are aligned or arrayed in the chordwise direction Ch, but the first tube 532 and the second tube 534 may have other arrangements within the airfoil 500. The airfoil 500 is otherwise similar to the airfoil 300 depicted in FIG. 4 and the discussion above applies here. The first tube 532 and the second tube 534 are similar to the tube 330 discussed above and the discussion of the tube 330 above applies to the first tube 532 and the second tube 534.

FIG. 7 is a schematic view of another woven fabric 600 that may be used to form the airfoil 500 shown in FIG. 5. The woven fabric 600 is similar to the woven fabric 400 shown in FIG. 5 and the methods of forming the woven fabric 600 shown in FIG. 7 is similar to the woven the methods of forming the woven fabric 400 discussed above. The discussion above also applies here, but, instead of a single cavity 410 (FIG. 5), the reinforcing fiber tows 202 are woven to form a plurality of cavities including a first cavity 612 and a second cavity 614 in the cavity region 420. The first cavity 612 and the second cavity 614 are formed similarly to cavity 410 discussed above and connected to the surface by one or more slits. In the depicted embodiment, the second cavity 614 is connected to the surface 402 by the slit 412, and an intermediate slit 616 connects the first cavity 612 to the second cavity 614. Other arrangements may be used including slits individually connecting each of the first cavity 612 and the second cavity 614 to the surface 402. The intermediate slit 616 is formed similarly to the slit 412 discussed above and the inserts (such as the first tube 532 and the second tube 534) can be inserted and co-molded as discussed above with reference to FIGS. 6A and 6B.

The woven fabric 400, 600 methods of forming the woven fabric 400, 600 and methods of forming a composite component (e.g., a strut or the airfoil 300, 500) using the woven fabric 400, 600 discussed herein, allow for a tube 330, 532, 534 (or other insert) to be co-molded with the reinforcing fiber tows 202, allowing the composite component to be thinner and have better producibility than processes that insert the service tube after molding.

Further aspects of the present disclosure are provided by the subject matter of the following clauses.

A method of manufacturing a woven fabric for a composite component for a turbine engine comprises weaving a plurality of reinforcing fiber tows to form a woven fabric with a surface, the reinforcing fiber tows including a plurality of first fiber tows and a plurality of second fiber tows oriented transversely to the plurality of first fiber tows, the woven fabric being a three-dimensional woven fabric having a first direction, a second direction orthogonal to the first direction, and a thickness direction orthogonal to each of the first direction and the second direction, the plurality of first fiber tows being arranged in the thickness direction to form a plurality of first fiber layers and the plurality of second fiber tows being arranged in the thickness direction to form a plurality of second fiber layers, forming, during weaving the plurality of reinforcing fiber tows, a cavity extending in the first direction by positioning the plurality of first fiber tows to create the cavity, and weaving the plurality of second fiber tows around the cavity, and forming, during weaving the plurality of reinforcing fiber tows, a slit connecting the cavity to the surface.

The method of the preceding clause, wherein the plurality of first fiber tows is a plurality of warp fiber tows and the plurality of second fiber tows is a plurality of weft tows.

The method of any preceding clause, wherein the first direction is a warp direction and the second direction is a weft direction.

The method of any preceding clause, wherein the woven fabric includes a first portion and a second portion opposing the first portion with the slit therebetween, the plurality of second fiber tows being woven to extend from the first portion around the cavity and to the second portion.

The method of any preceding clause, wherein the first portion and the second portion are free from interconnection across the slit by the plurality of second fiber tows.

The method of any preceding clause, wherein the reinforcing fiber tows include a plurality of interlocking fiber tows.

The method of the preceding clause, wherein the woven fabric includes a first portion and a second portion opposing the first portion with the slit therebetween, the first portion and the second portion being free from interconnection across the slit by the plurality of interlocking fiber tows.

The method of the preceding clause, wherein the interlocking fiber tows are woven in an orthogonal interlocking pattern.

The method of the preceding clause, wherein orthogonal interlocking pattern extends through the thickness of the woven fabric.

The method of any preceding clause, wherein the interlocking fiber tows are woven in an angle interlock pattern.

The method of the preceding clause, wherein angle interlock pattern extends through adjacent fiber layers in an alternating or a sinusoidal pattern to interlock these adjacent layers with each other.

The method of any preceding clause, wherein angle interlock pattern extends through more than two adjacent fiber layers.

The method of the preceding clause, wherein angle interlock pattern extends through the thickness of the woven fabric.

The method of any preceding clause, wherein, during weaving the plurality of reinforcing fiber tows, a portion of one or more second fiber tows of the plurality of second fiber tows extends beyond the surface in a region of the cavity.

The method of any preceding clause, further comprising trimming the portion of the one or more second fiber tows that extends beyond the surface.

The method of any preceding clause, wherein the cavity is one cavity of a plurality of cavities formed during weaving the plurality of reinforcing fiber tows.

The method of the preceding clause, wherein the slit is one slit of a plurality of slits connecting each cavity of the plurality of cavities to the surface.

A method of manufacturing a preform for a composite component for a turbine engine, the method comprising preparing a woven fabric using the method of any preceding clause, inserting an insert through the slit, and positioning the insert in the cavity.

A method of the preceding clause, wherein the insert is a tube and the tube has an opening extending in the first direction.

A method of forming a composite component, the method comprising preparing a preform using the method of any preceding clause, the plurality of reinforcing fiber tows including prepreg fiber tows to introduce a matrix material, and curing the preform including the matrix material to generate the composite component.

The method of any preceding clause, wherein the composite component is an airfoil including a spanwise direction, and the method further comprises positioning the woven fabric with the first direction extending in the spanwise direction.

The method of any preceding clause, further comprising curing the preform to remove the slit.

The method of any preceding clause, wherein the tube is in contact with the matrix material after curing the preform.

The method of any preceding clause, wherein the matrix material surrounds the tube.

A method of forming a composite component, the method comprising preparing a preform using the method of any preceding clause, injecting a matrix material into the preform to generate an infiltrated preform, and curing the infiltrated preform to generate the composite component.

The method of any preceding clause, wherein the composite component is an airfoil including a spanwise direction, and the method further comprises positioning the woven fabric with the first direction extending in the spanwise direction.

The method of any preceding clause, wherein curing the infiltrated preform removes the slit.

The method of any preceding clause, wherein the tube is in contact with the matrix material after curing the preform.

The method of any preceding clause, wherein the matrix material surrounds the tube.

Although the foregoing description is directed to certain embodiments, other variations and modifications will be apparent to those skilled in the art and may be made without departing from the disclosure. Moreover, features described in connection with one embodiment may be used in conjunction with other embodiments, even if not explicitly stated above.

The invention claimed is:

1. A method of manufacturing a woven fabric for a composite component for a turbine engine, the method comprising:

weaving a plurality of reinforcing fiber tows to form a woven fabric with a surface, the reinforcing fiber tows including a plurality of first fiber tows, a plurality of second fiber tows oriented transversely to the plurality of first fiber tows, and a plurality of interlocking fiber tows, the woven fabric being a three-dimensional woven fabric having a first direction, a second direction orthogonal to the first direction, and a thickness direction orthogonal to each of the first direction and the second direction, the plurality of first fiber tows being arranged in the thickness direction to form a plurality of first fiber layers and the plurality of second fiber tows being arranged in the thickness direction to form a plurality of second fiber layers, and the plurality of interlocking fiber tows extending in the first direction and the thickness direction;

forming, during weaving the plurality of reinforcing fiber tows, a cavity extending in the first direction by:

positioning the plurality of first fiber tows to create the cavity; and weaving the plurality of second fiber tows around the cavity; and forming, during weaving the plurality of reinforcing fiber tows, a slit extending in the second direction and connecting the cavity to the surface.

2. The method of claim 1, wherein the plurality of first fiber tows is a plurality of warp fiber tows and the plurality of second fiber tows is a plurality of weft fiber tows.

3. The method of claim 2, wherein the first direction is a warp direction and the second direction is a weft direction.

4. The method of claim 1, wherein the woven fabric includes a first portion and a second portion opposing the first portion with the slit therebetween, the plurality of second fiber tows being woven to extend from the first portion around the cavity and to the second portion.

5. The method of claim 4, wherein the first portion and the second portion are free from interconnection across the slit by the plurality of second fiber tows.

6. The method of claim 1, wherein the woven fabric includes a first portion and a second portion opposing the first portion with the slit therebetween, the first portion and the second portion being free from interconnection across the slit by the plurality of interlocking fiber tows.

7. The method of claim 1, wherein, during weaving the plurality of reinforcing fiber tows, a portion of one or more second fiber tows of the plurality of second fiber tows extends beyond the surface in a region of the cavity.

8. The method of claim 7, further comprising trimming the portion of the one or more second fiber tows that extends beyond the surface.

9. A method of manufacturing a preform for a composite component for a turbine engine, the method comprising:

preparing a woven fabric using the method of claim 1;

inserting a tube through the slit; and positioning the tube in the cavity, the tube having an opening extending in the first direction.

10. A method of forming a composite component, the method comprising:

preparing a preform using the method of claim 9, wherein the plurality of reinforcing fiber tows includes prepreg fiber tows comprising a matrix material; and curing the preform including the matrix material to generate the composite component.

11. The method of claim 10, wherein the composite component is an airfoil including a spanwise direction, and the method further comprises positioning the woven fabric with the first direction extending in the spanwise direction.

12. The method of claim 10, wherein curing the preform removes the slit.

13. The method of claim 10, wherein the tube is in contact with the matrix material after curing the preform.

14. The method of claim 13, wherein the matrix material surrounds the tube.

15. A method of forming a composite component, the method comprising:

preparing a preform using the method of claim 9;

injecting a matrix material into the preform to generate an infiltrated preform; and curing the infiltrated preform to generate the composite component.

16. The method of claim 15, wherein the composite component is an airfoil including a spanwise direction, and the method further comprises positioning the woven fabric with the first direction extending in the spanwise direction.

17. The method of claim 15, wherein the curing the infiltrated preform removes the slit.

18. The method of claim 15, wherein the tube is in contact with the matrix material after curing the preform.

19. The method of claim 18, wherein the matrix material surrounds the tube.

* * * * *